Dec. 12, 1950 R. C. GUNNESS 2,533,666
HYDROCARBON SYNTHESIS
Filed Dec. 29, 1945 2 Sheets-Sheet 1

Inventor:
Robert C. Gunness
By: Everett A. Johnson
Attorney

Dec. 12, 1950 R. C. GUNNESS 2,533,666
HYDROCARBON SYNTHESIS
Filed Dec. 29, 1945 2 Sheets-Sheet 2
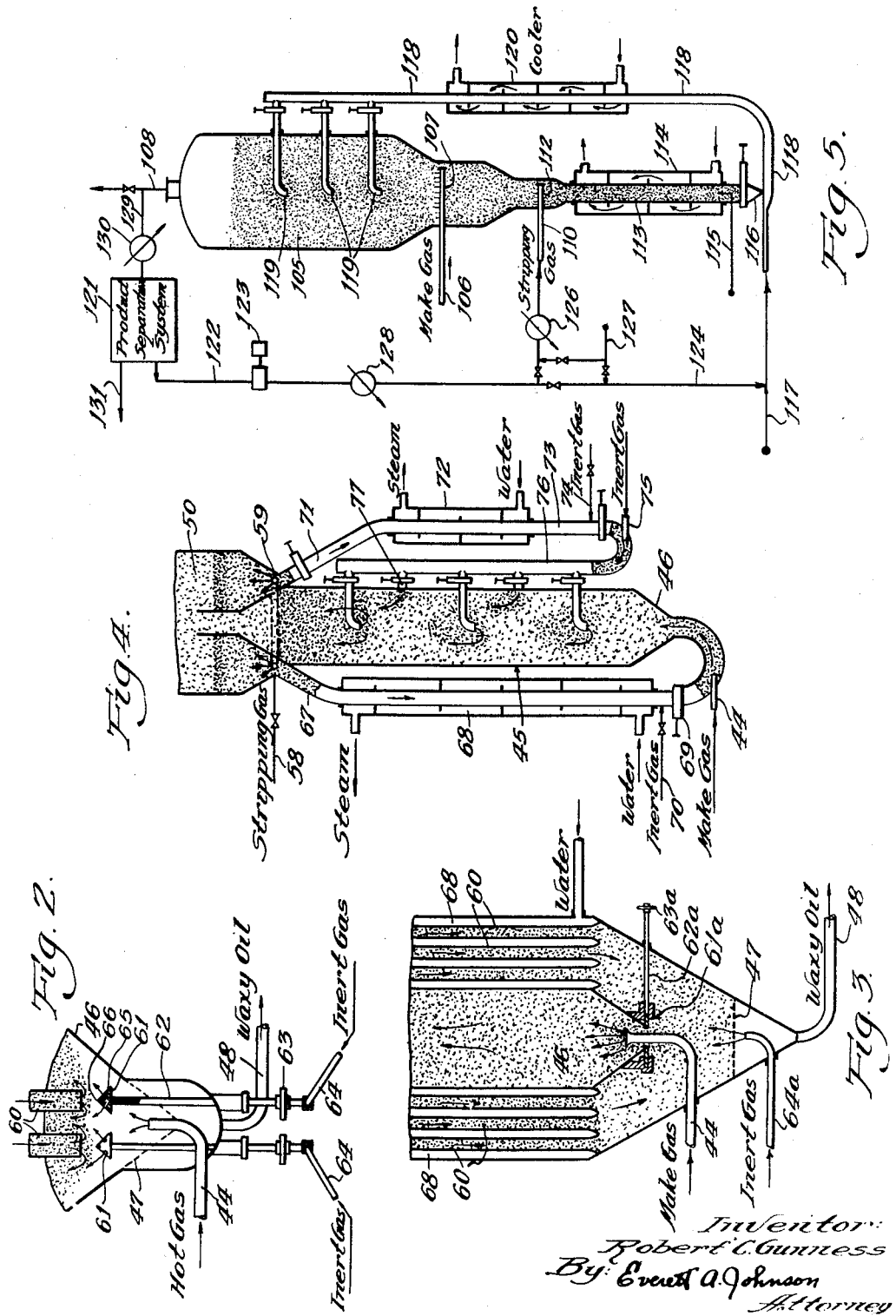
Inventor:
Robert C. Gunness
By Everett A. Johnson
Attorney Patented Dec. 12, 1950

2,533,666

UNITED STATES PATENT OFFICE 2,533,666

HYDROCARBON SYNTHESIS

Robert C. Gunness, Flossmoor, Ill., assignor to Standard Oil Company, Chicago, Ill., a corporation of Indiana Application December 29, 1945, Serial No. 638,412

8 Claims. (Cl. 260—449.6)

This invention relates to an improved method and means for effecting chemical reactions such as for example the synthesis of hydrocarbons from mixtures of carbon monoxide and hydrogen.

Heretofore a major problem in this synthesis has been that of heat removal and temperature control of the exothermic reaction. The synthesis is catalytic and it has been necessary to have each catalyst particle immediately adjacent a heat exchange surface, i. e., within a few millimeters thereof. Prior synthesis reactors have, therefore, been extremely complicated and expensive and it has been most difficult to obtain access to the inner part of a synthesis reactor for the purpose of repair or for replacing catalyst material. An object of my invention is to provide a system wherein heat exchange surfaces may be entirely eliminated from the synthesis zone and wherein the heat developed by the synthesis may be removed in a separate zone. A further object is to provide a system wherein the synthesis temperature may be controlled and maintained within very close limits. A further object is to provide a simple and relatively inexpensive synthesis reactor which is more efficient in operation than the expensive and complicated reactors heretofore employed.

The catalyst employed for effecting the synthesis is expensive and it is essential that catalyst losses be maintained at an absolute minimum. An object of my invention is to provide improved methods and means for preventing catalyst losses from synthesis reactors.

The synthesis has heretofore been effected in fixed catalyst beds so that the catalyst in one portion of the bed became spent sooner than the catalyst in another portion of the bed. The carbon monoxide-hydrogen mixture was rapidly converted in the initial portion of the catalyst bed but thereafter the reaction was materially slowed down because of the presence of reaction products, some of which products diluted the carbon monoxide and hydrogen mixture and some of which products coated the catalyst and made it less effective. An object of my invention is to provide a system wherein the incoming carbon monoxide and hydrogen mixture always contacts a catalyst which has been stripped of reaction products, wherein the catalyst activity is substantially uniform throughout the reaction zone and wherein the extent and nature of the conversion may be more closely controlled than in any prior process. A further object is to provide a system which is flexible in operation so that it may be employed under atmospheric or superatmospheric conditions and so that it may selectively produce a large preponderance of hydrocarbons of the motor fuel boiling range, or the lubricating oil boiling range or any other desired boiling range.

A further object of the invention is to provide an improved system for converting hydrocarbon gases such as natural gas into normally liquid or normally solid hydrocarbons and to utilize in this system the methane and ethane which is produced in the system itself. A further object is to improve the efficiency and to decrease the expense of the system for obtaining a desired hydrogen-carbon monoxide mixture from normally gaseous hydrocarbons, particularly methane and ethane. A further object is to provide an improved method and means for purging the system of nitrogen.

Another object of the invention is to avoid or minimize the separation of waxy oil drips from the reaction zone and to provide an improved method and means for stripping reaction products from the catalyst at very short intervals thereby decreasing or eliminating any tendency of reaction products to accumulate in the catalyst mass. Other objects will be apparent as the detailed description of the invention proceeds.

In practicing my invention I may employ normally gaseous hydrocarbons from any source whatsoever but I prefer to employ natural gas which consists chiefly of methane since it is extremely difficult to convert this particular gas into high molecular weight hydrocarbons by any other process. The natural gas is first freed from hydrogen sulfide and organic sulfur compounds by scrubbing with a suitable solvent such as monoethanolamine, triethanolamine, or the like followed, if necessary, by scrubbing with a strong caustic solution. The desulfurized gas is then mixed with such proportions of carbon dioxide, steam, and/or oxygen as to give a gas mixture having an atomic hydrogen:carbon:oxygen ratio of about 4:1:1 for cobalt catalyst and 4:1:1 to 2:1:1 for iron catalyst. This mixture is then contacted with a reforming catalyst, preferably one containing an VIIIth group metal. The catalyst may be either unsupported or supported on clay, kieselguhr, silica gel, alumina, etc. Such a catalyst, for instance, may be a mixture of the oxides of nickel, iron and manganese with the proportions 1:1:0.5. The nickel or other VIIIth group metal oxide catalyst may be promoted by oxides or aluminum, magnesium, calcium, uranium, chromium, molybdenum, vanadium, etc.

The space velocity through the gas reforming catalyst should be sufficient to give a contact time of about 2 to 60, preferably about 10 to 30 seconds. The temperature of this operation is preferably 1,400 to 1,650° F. and the pressure may be about atmospheric to 150 pounds per square inch or higher, pressures of the order of 150 to 750 pounds per square inch being desirable when the synthesis is to be effected with iron catalyst. This reforming operation converts the methane-carbon dioxide-steam mixture into a gas consisting chiefly of hydrogen and carbon monoxide in the proportions 2:1 to 1:1. This gas mixture will be hereinafter referred to as "make" gas or "synthesis" gas.

A considerable amount of heat must be supplied for the gas reforming operation. This heat is preferably produced by burning a part of the desulfurized gas admixed with a part of recylced gas from the system. A considerable amount of the heat contained in the flue gas from the gas reformer burner may be used for preheating air which is to be charged to the burner. Water is then separated from the cooled flue gas and the flue gas is scrubbed with suitable solvent such as monoethanolamine for absorbing carbon dioxide therefrom. The undissolved nitrogen is expelled from the system. The carbon dioxide is recovered and employed along with desulfurized gas and steam for the production of make or synthesis gas as hereinabove described.

My synthesis reactor is preferably a vertical tower which contains no heat exchange surfaces therein but which may be bounded by heat exchange surfaces. Catalyst is suspended in this tower by the up-flowing make gas. By properly controlling the upward velocity of the make gas in the tower and the amount of powdered catalyst introduced into the tower I may control the amount of catalyst in the tower and the synthesis gas residence time in the tower, thus obtaining the contact of a given quantity of synthesis gas with any desired quantity of catalyst for any desired time.

With a settled catalyst bulk density of about 10 to 40 pounds per cubic foot and with a uniformly small particle size the vertical gas velocity of the make gas will usually be within the range of about .1 to 10 feet per second—in most cases about .5 to 1.5 feet per second but it will depend, of course, on the density, particle size and character of the particular catalyst which is employed as well as upon desired conversion and reaction conditions, such as temperature, pressure, etc. For iron catalyst of small particle size the settled bulk density may be of the order of 40 to 100 or more pounds per cubic foot, and in this case the bulk density may gradually decrease during operation; for iron catalyst the vertical gas velocity may likewise be in the range of .1 to 10 per second, usually about 1 to 5 feet per second. The bulk density of catalyst in the reactor is usually at least about 2 to 10 pounds per cubic foot lower than the bulk density of settled catalyst but the bulk density of catalyst in the reactor should be sufficiently great so that the suspended catalyst mixture will behave as a liquid and exhibit such turbulence that there will be intimate and uniform mixing of the catalyst in the reaction zone. The gas velocity should be low enough to obtain and maintain a dense opaque phase of suspended catalyst. In at least one embodiment it should be high enough to prevent the catalyst from actually settling out of the gases and caking and to continuously carry a substantial amount of the catalyst to an upper settling zone so that it may be cooled and recycled for temperature control.

The temperature of the synthesis step is usually within the range of about 225 to 425° F. or more for cobalt and about 425° F. to 625° F. for iron catalysts, the lower temperatures tending toward the production of heavier hydrocarbons such as waxes and the higher temperatures tending toward the production of lighter hydrocarbons such as gases. With ordinary cobalt catalyst the synthesis should be effected within a relatively close temperature range of about 325 to 395° F. Maximum liquid yields are obtained at these temperatures with a minimum production of lighter and heavier hydrocarbons. Iron catalysts offer greater tolerance with respect to temperature of operation, the best range being about 475 to 600° F.

Temperature control is effected by cooling either catalyst material or incoming gases or both in a zone or zones outside of the synthesis zone. Heretofore it has always been deemed essential that the entering gases should be at synthesis temperature and that heat exchange surfaces be provided within a few millimeters of each catalyst particle in the synthesis reactor. By maintaining the turbulent gas suspension of catalyst particles in the reactor as hereinabove described I have discovered that the temperature is substantially the same in all parts of the reactor. Thus instead of employing the heat of synthesis for boiling water in the synthesis zone, as in previous processes, I employ the heat of synthesis for bringing make gases and introduced catalyst to reaction temperature.

Since reaction temperature is reached substantially instantaneously I maintain the reaction temperature within closer limits than was possible in the cumbersome heat reactors heretofore employed. In other words, the relatively cool catalyst which is constantly being injected into the reactor is instantaneously dispersed throughout the reactor and each particle of such catalyst is in intimate contact with catalyst particles at the surface of which heat is being liberated. Since each particle of catalyst is surrounded by a gas envelope and is in intimate contact with other catalyst particles there is no possibility of the development of hot spots or overheating. An important feature of my invention is this remarkably efficient and effective means of obtaining temperature control in the synthesis reactor.

Another feature of my invention is a method and means for obtaining complete separation of catalyst from gases and vapors and the recycling of this catalyst through suitable coolers to the synthesis reactor. I provide an enlarged settling zone above the reactor and within this settling zone I may provide a plurality of centrifugal separators. The settled catalyst is intimately mixed with centrifugally separated catalyst and this mixture of catalyst is stripped with hot gas before it is cooled for reintroduction into the synthesis zone in order to prevent the accumulation on the catalyst particles of heavy reaction products such as oils or waxes. Thus while in prior processes the initial make gas originally contacted a catalyst which was wet with reaction products, I have provided a process wherein the initial make gas contacts a catalyst which has been freed from reaction products.

The reaction products are cooled for the separation of water and any traces of catalyst not removed by cyclone separators (or by electrostatic precipitators if such are employed) may be recovered with the condensed water and reworked for the preparation of new catalyst. Alternatively the steam for stripping may be obtained by flashing the aqueous catalyst slurry so that the stripping steam will reintroduce this catalyst into the body of catalyst which is being recirculated through the cooler to the reactor. Carbon dioxide of hydrogen may likewise be used as the stripping gas and then carried with recycled methane, etc. to the gas reforming step for the preparation of synthesis gas.

The reaction products may be fractionated in any conventional manner but I prefer to employ an absorption system for separating $C_3$ and $C_4$ hydrocarbons from unreacted make gases, methane, ethane and ethylene. The $C_3$ and $C_4$ hydrocarbons are rich in olefins and may be converted by polymerization, alkylation, gas reversion or other known processes into high quality motor fuels or heavier oils. The stream of separated make gas, which contains considerable amounts of methane, ethane and ethylene, is usually split, a part of it being sent to the gas reformer and a part to the burner of the gas reformer, the size of the latter stream being sufficiently large to keep the system substantially purged from nitrogen.

The invention will be more clearly understood from the following detailed description read in conjunction with the accompanying drawings which form a part of the specification and in which:

Figure 2 is a detailed section illustrating the elements in the lower part of the reactor in Figure 1;

Figure 3 is a vertical section of the lower part of a reactor similar to the reactor shown in Figure 1 but offering certain additional advantages;

Figure 4 is a vertical section of modified reactor and catalyst cooling and recycling means; and Figure 5 is a vertical section of another modified reactor and catalyst cooling and recycling means.

Figure 1:
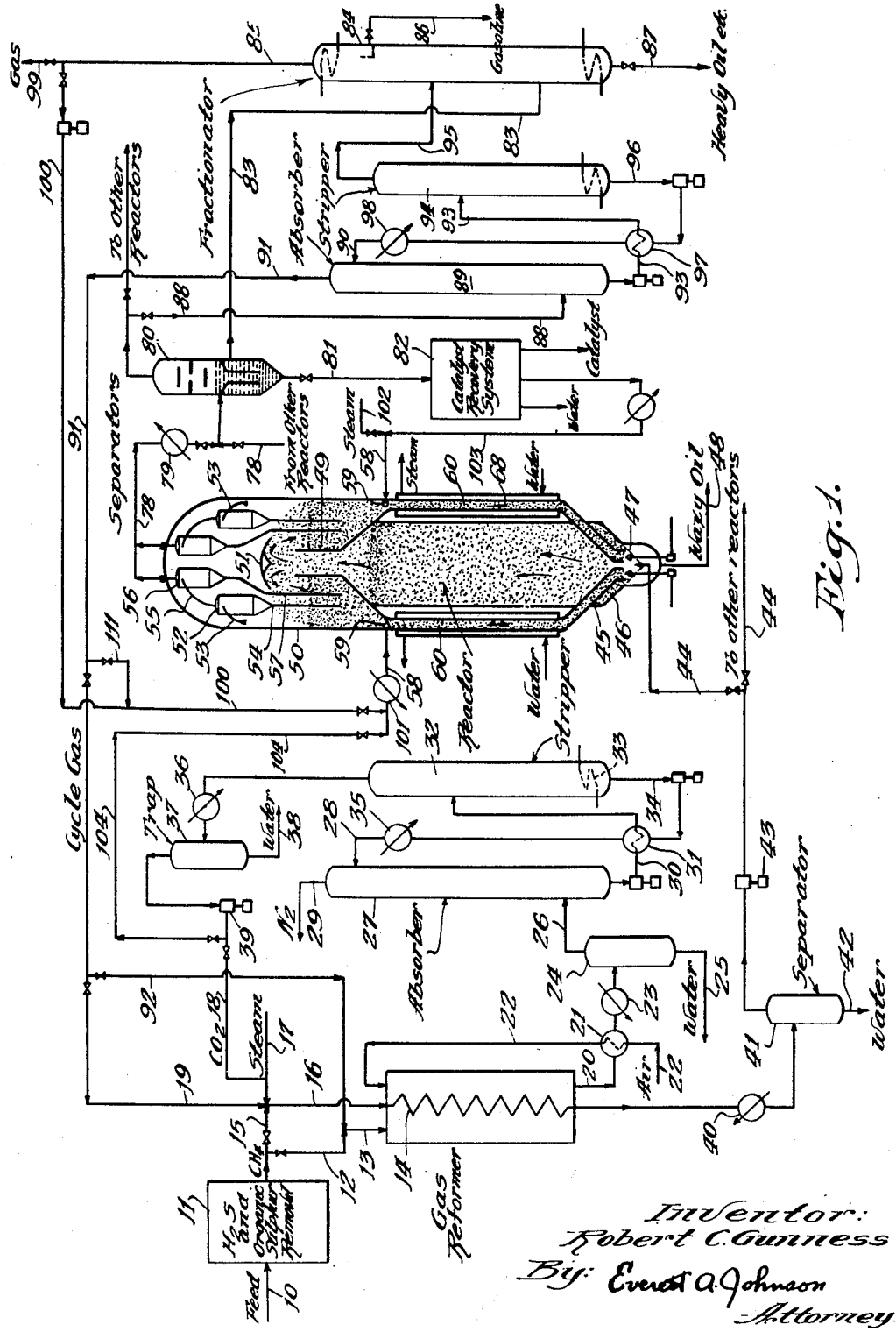
Figure 1 is a schematic flow diagram of my entire system.

As a specific embodiment of my invention I will described a system for handling about 40,000,000 cubic feet per day of a natural gas which consists essentially of methane. The application of the invention to other charging stock and to plants of various sizes will be apparent to those skilled in the art from the following description.

The charging stock from line 10 is first desulfurized in any conventional system 11. When the gas contains no organic sulfur compounds, this desulfurization may be effected in a conventional Girdler process wherein the gas is scrubbed with monoethanolamine or triethanolamine. Hydrogen sulfide may likewise be removed by the Koppers process or by the so-called phosphate process wherein the gas is countercurrently scrubbed in a packed tower with a two mol solution of potassium phosphate. If organic sulfur is present it may be necessary to supplement the extraction process with a concentrated caustic wash. The hydrogen sulfide content should be reduced to at least about .001 grain per cubic foot and this desulfurization may be effected in any known manner. The desulfurization step per se forms no part of the present invention and it will not be described in further detail.

The stream of desulfurized gas from treating system 11 is split, about 11,000,000 cubic feet per day being introduced through lines 12 and 13 to the burner for heating gas reformer coils or chambers 14, and the remaining 29,000,000 cubic feet per day being passed through lines 15 and 16 for passage through said reformer coils or chambers 14 together with steam introduced through line 17, carbon dioxide introduced through line 18 and recycled gas introduced through line 19. The daily charge to the reformer coils may be substantially as follows:

|  | Cubic feet per day |
|---|---|
| Methane (from line 15) | 29,000,000 |
| Carbon dioxide | 9,000,000 |
| Steam | 25,000,000 |
| Recycle gas | 40,000,000 |

For iron catalysts considerably less steam is required. This gas mixture is passed through catalyst chamber or coil 14 at a pressure of about atmospheric to 150 pounds per square inch or more, for example, at about 15 pounds per square inch and at a temperature of about 1400 to 1650° F., for example about 1500 to 1550° F. at such space velocity as to give a contact time of about 2 to 60 seconds, for example about 10 to 30 seconds. If desired a moving bed of heat carrier material can be used in a regenerative cycle wherein some of the gas to be reformed is burned.

As above stated, the catalyst when used for this reformer step may be one or more VIIIth group metal oxides, such as nickel or iron or a mixture of nickel oxides and iron oxide. The catalyst may be promoted by other metal oxides, such as aluminum, magnesium, manganese, calcium, uranium, chromium, molybdenum, vanadium, etc. and it may be supported on any suitable support such as clay, kieselguhr, silica gel, alumina, etc. A catalyst, for example, may be a mixture of the oxides of nickel, iron and manganese with the metals in the proportion 1:1:0.5. No invention is claimed in the catalyst per se and since such catalysts are well known in the art further detailed description is unnecessary.

The heat required for the gas reforming step in this particular example is about 635,000,000 B.t.u. per hour. A considerable amount of heat from the flue gases leaving the gas reformer furnace through line 20 may be utilized for preheating air in heat exchanger 21, the air being introduced by line 22 to support combustion in the gas reformer furnace. Flue gases which have been partially cooled in heat exchanger 21 may be further cooled in heat exchanger 23 to a temperature sufficiently low to permit condensation of water which may be separated from the cooled flue gases in trap 24 and withdrawn through line 25. The remaining gas mixture may be introduced through line 26 into the base of absorption tower 27 wherein it is scrubbed with cool monoethanolamine or other suitable scrubbing liquid introduced through line 28. The nitrogen is not absorbed in the scrubbing liquid and is removed from the top of the tower through line 29.

The rich scrubbing liquid containing carbon dioxide is pumped through line 30 and heat exchanger 31 to the top of stripping tower 32 which is provided with heating means 33 at its base. The scrubbing liquid is withdrawn from the base of the tower through line 34 and pumped through heat exchanger 31 and cooler 35 back to the top of absorber tower 27.

The carbon dioxide removed from the top of tower 32 may be cooled in heat exchanger 36 and passed through trap 37 from which any condensed water may be withdrawn through line 38. The gas from the top of trap 37 passes through compressor 39 to line 18 for the preparation of make gas charge to the gas reformer.

The basic equations for the gas reforming operation may be somewhat as follows:

$$CO_2 + CH_4 \rightarrow 2CO + 2H_2$$
$$2CH_4 + 2H_2O \rightarrow 2CO + 6H_2$$

The cycle gas, of course, contains ethane and ethylene as well as methane carbon dioxide, and unreacted make gas but the reaction of these hydrocarbons is similar to that hereinabove indicated. The proportions of carbon dioxide and steam should be so adjusted as to give a make gas or synthesis gas of about 2 parts hydrogen to 1 part carbon monoxide for cobalt catalyst; the ratio may be as low as 1:1 for iron catalyst.

The hot make gas is cooled in cooler 40 to about room temperature or lower and passed through trap 41 from which condensed water may be withdrawn through line 42. The gases are then passed by compressor 43 through line 44 to the base of synthesis reactor 45. In the example herein set forth about 130,000,000 cubic feet per day or about 5,400,000 cubic feet per hour or about 90,000 cubic feet per minute of make gas is thus charged to the synthesis reactor.

The catalyst for the synthesis step may be metallic cobalt or nickel on a suitable carrier such as kieselguhr, silica gel, alumina, etc. with one or more promoting oxides such as oxides of magnesium, thiorium, manganese, aluminum, etc. For instance, about one part by weight of cobalt may be supported on about two parts by weight of kieselguhr and promoted with a small amount of thorium oxide or magnesium oxide or with a mixture of thorium and magnesium oxides. A mixture of nickel and copper oxides suitably calcined gives a good synthesis catalyst. Ruthenium has also been found to be an excellent synthesis catalyst. A fluidizable cobalt-on-Super Filtrol catalyst or an iron catalyst such as iron oxide, ammonia type, catalyst can be used. Such catalyst may be prepared as follows: A good grade of magnetite containing 0.1-2% potassium based on iron and some alumina say 5% is fused in an induction furnace. (The alumina is usually native to the ore while the potassium may be added in the form of potash or other compounds.) After fusion the potassium content can be adjusted by water treatment. The catalyst can be crushed to a convenient mesh, reduced in hydrogen at 500 to 600° C. and finally milled to a powder suitable for fluid operation. Alternatively the catalyst can be reduced after milling in the synthesis reactor itself. Catalysts per se for effecting the synthesis reaction are well known in the art and are described in numerous patents and publications. Since no invention is claimed in the catalyst per se a further description of catalyst composition is unnecessary.

It should be pointed out that in accordance with the present invention the catalyst should preferably be rather finely divided and of fairly uniform particle size. For example, I may employ catalysts having a particle size of from about 100 to 400 mesh or smaller but it should be understood that larger catalyst particle size may be used if gas velocities, reactor designs, etc. are correspondingly modified. The bulk density of the catalyst in settled state may be about 10 to 40 pounds per cubic foot in the case of cobalt catalyst and 40 to 200 pounds per cubic foot in the case of iron catalyst.

My synthesis reactor may consist of one or more vertical towers which may range from about 8 to 40 feet or more in diameter and from about 20 to 50 feet or more in height. The base of the reactor may be provided with an inclined conical hopper or funnel-shaped bottom 46 with a slope of about 60 degrees or more so that there will be a suspension of the catalyst when the make gases are introduced at the base of this funnel-shaped reactor bottom. Alternatively distributing means may be provided at the base of the reactor for insuring uniform distribution of make gases throughout the reactor chamber and for maintaining the catalyst in a suspension. A screen 47 may be provided below the make gas inlet and a sump may be provided below this screen so that any accumulated waxy oils may be withdrawn through line 48. When my process is operated for the production of relatively light liquid hydrocarbons and the catalyst is effectively stripped, this screen, sump and draw-off will usually be unnecessary and the make gases may be introduced directly at the base of the reactor as illustrated in the drawings.

The top of the reactor may be open or restricted as shown in the drawings and it may terminate in pipe 49 which extends upwardly in an enlarged settling chamber 50. When restricted, a baffle 51 may be mounted above the pipe 49 to deflect suspended catalyst particles and uniformly distribute the products and catalyst in the settling space.

A plurality of centrifugal separators may be mounted in the upper part of the settling chamber. For example, one or more primary cyclone separators 52 may pick up, through inlet 53, gases and vapors from which the bulk of the catalyst has been settled out. Additional catalyst removed from the gases and vapors in the primary centrifugal separator may be returned to a point well below the surface of settled catalyst by means of dip leg 54, the head of settled catalyst in the dip leg balancing the difference between the pressure in the settling chamber and the pressure in the primary cyclone separator.

Gases and vapors from the primary separator may be introduced by line 55 into one or more secondary cyclone separators 56 which are provided with dip legs 57. Here again the head of catalyst in the dip leg will balance the difference between the pressure in the settler and the pressure in the cylone separator. Each dip leg may be provided with an externally operated valve and with steam connections above and below the valve so that if any dip leg becomes clogged, it may be freed of clogging material by closing the valve and blowing both ways with steam. Any number of stages of cyclone separation may be employed and, if necessary or desired, an electrostatic precipitator, such as a Cottrell precipitator, may be employed for the recovery of catalyst fines.

The recovered catalyst settles in the annular space between pipe 49 and the walls of chamber 50, this space serving as a hopper for recovered catalyst and a storage tank into which fresh catalyst may be charged at the beginning of an operation or introduced from time to time during the operation for the purpose of making up any catalyst losses. The settled catalyst in this upper hopper is maintained in an aerated and fluent condition by the introduction of a hot stripping gas such as steam, hydrogen, hydrocarbon gases, or carbon dioxide through line 58. The stripping gas may for example comprise a recycle gas mixture. A number of such pipes may be employed at spaced points around the base of the hopper or a perforated annular pipe 59 may be placed at the base of the hopper and supplied with stripping gas through line 58. The stripping gas not only serves to maintain the catalyst in fluent or liquid-like form but it serves the very important function of removing reaction products from the settled catalyst and thus prevents an accumulation of hydrocarbon liquids on the catalyst which might impair catalyst activity or interfere with proper handling of the fluidized catalyst suspension.

The catalyst flows from the base of the upper hopper through a plurality of cooling tubes 60 which are surrounded by jackets 68 containing a heat exchange fluid such as water. These tubes discharge the catalyst into the lower part of the reactor.

The cooling system may be of various modifications. I may withdraw catalyst from the hopper in one or more large conduits, pass the catalyst through the tubes of a tubular heat exchanger and then return the catalyst to the reactor chamber. I may simply surround the tubes with water jacket coolers. I may surround the synthesis reactor with an annular chamber containing a large number of vertical tubes and I may pass the catalyst from the hopper through these tubes to the lower part of the reactor while circulating a cooling fluid around the tubes in the annular chamber as illustrated in Figure 3. With regard to the catalyst cooler per se, it is preferred that if a tubular heat exchanger is employed that the catalyst be passed through the inside of the tubes and that the ends of the tubes be suitably designed and stream-lined to provide uniform catalyst distribution and to avoid dead spots. Whether the catalyst is passed through the tubes or around the tubes will depend on known practical considerations in view of the particular cooling medium, temperature, pressure, etc.

The systems diagrammatically illustrated in the drawings offer the advantage of a gravity siphon effect since the catalyst in the synthesis reactor has a density about 2 to 10 pounds per cubic foot lighter than the density of aerated catalyst in tubes 60. This denser catalyst will flow downwardly without the necessity of employing injection gases or mechanical injection devices.

In the catalyst return system illustrated in Figures 1 and 2, it may be desirable to disperse the returned catalyst in the up-flowing gas stream and it may also be desirable to maintain a slight aeration of the catalyst in the cooling leg in order to insure its fluent properties. To accomplish this purpose I may provide a closure member 61 which is preferably conically-shaped and which is carried by a hollow shaft or stem 62 extending through the reactor wall to external operating means 63. Hydrogen, methane, steam or other inert gas may be introduced through line 64 through the hollow stem and discharged through laterally inclined ports 65 in closure member 61. Alternatively, some or all of this gas may be vented from the center of the closure member through port 66 for supplying aeration gas in pipe 60. Closure 61 is preferably conically shaped so that it acts to deflect and distribute the returned catalyst into the upflowing gases introduced through line 44. The distribution of the catalyst in the gases is augmented by the gases discharged from lateral parts 65.

In Figure 3 I have illustrated the modification wherein the synthesis reactor is surrounded by an annular chamber containing a large number of vertical tubes. In this modification the outer wall of the annular chamber may be extended to entirely surround the bottom of the reactor. For example, conical bottom 46a may act as a reservoir for introducing aerated catalyst into the reactor through the open end of the conically shaped reactor bottom 46. In this case screen 47 may be mounted in the base of conical bottom 46a and an aerating gas may be introduced through line 64a to maintain the catalyst in aerated and fluent form not only in the bottom chamber 46a but in the cooling tubes 60. Aerating fluid may be introduced at spaced points around the bottom 46a and also at spaced vertical points so as to prevent any settling of the catalyst on 46a and to provide the desired aeration within the tubes 60. Since the catalyst in the reservoir in 46a is in fluent or liquid-like form, it will flow upwardly into the base of the reactor and will be picked up and suspended as a dense phase in the reactor by synthesis gas introduced through line 44. The rate of flow into the synthesis reactor may be controlled by an iris diaphragm valve 61a operated by rod 62a extending through wall 46a to external operating means 63a. It will be understood of course that instead of employing an iris diaphragm valve I may employ a simple slide valve with opposed V-shaped openings or any other valve means for controlling the flow of the fluent catalyst into the reactor.

My invention is not limited to a gravity return of cooled catalyst and in Figures 4 and 5 I have illustrated systems wherein the catalyst is externally cooled and then returned to the reactor by means of a suspending gas.

In the embodiment illustrated in Figure 4 catalyst may be discharged from the hopper of enlarged settling zone 50 through a suitable cooler diagrammatically represented by standpipe 67 surrounded by cooling jacket 68. The catalyst in this pipe may be aerated by an inert gas introduced through line 70. When it is desired to restrict the flow therefrom the standpipe may be provided at its base with suitable slide valve or star feeder 69. Cooled catalyst discharged through valve 69 from the base of this standpipe is picked up by make gases from line 44 and dispersed therewith directly into the base 46 of reactor 45.

Instead of injecting the cooled catalyst with incoming make gases I may recycle the catalyst from the upper hopper through pipe 71 to heat exchanger 72 and thence to a standpipe 73 which may be aerated by gas introduced through line 74. Catalyst from the case of this standpipe may be picked up by an inert gas from line 75 and carried thereby through line 76 for introduction at spaced points along the reactor through any one or more of the lines 77. The net flow of catalyst in this system is upward.

Figure 5 illustrates a simple modification of my invention which includes a reactor wherein a fluidized dense catalyst phase is maintained, a stripping section associated with the reactor, and means for introducing reacting and stripping fluids respectively. The gas or vapors are passed upwardly through the reactor at such a vertical velocity that a lower mass of fluidized dense phase catalyst is maintained therein. A conduit means is provided for withdrawing the reaction products, unreacted gases and stripping fluid from an upper part of the reactor where the catalyst is in a very dilute phase. A catalyst draw-off conduit leads from the base of the stripping zone to a catalyst cooler and means is provided for distributing the cooled catalyst throughout the reactor. The fluidized dense phase catalyst is withdrawn at a rate sufficient to maintain a substantially catalyst-free zone in the the upper part of the reactor and to permit the desired extraction of heat. Supplemental catalyst recovery means such as cyclone separators can be provided to remove additional amounts of catalyst from the substantially catalyst-free vapors and gases in the upper part of the contacting zone. More particularly my system illustrated in Figure 5 for effecting exothermic reactions employs a vertical cylindrical reactor 105. Line 106 supplies a hydrogen-carbon monoxide feed to a low part of the reactor by means of distributor 107. The upward velocity of the gases or vapors ordinarily will be between about 0.1 and 10 feet per second in the reaction zone. Lines 108 and 129 remove vapors and gases, substantially free of catalyst, from the upper part of the reactor which are passed through cooler 130 into product separation system 121.

Communicating with the reactor 105 is a catalyst stripping means 109 illustrated as being a lower section of smaller cross-sectional area than the reactor proper. A stripping fluid is supplied by line 110 to distributor 112 and serves to remove heavier reaction products. If desired the stripping section 109 can include a plurality of vertically disposed vanes for providing a plurality of substantially parallel channels. Such vanes avoid material turbulence within the stripping section and assure positive contact with the withdrawn catalyst by the stripping fluid. A drawoff conduit 113 directs catalyst from stripping section 109 into a catalyst cooler 114 which is diagrammatically represented as comprising a jacket about standpipe 113, means being provided for passing a heat exchange medium such as water through the jacket. The water can be recovered from the product stream and the steam produced can be supplied as at least a part of the stripping fluid in 112. Standpipe 113 is adapted to transfer catalyst from the cooler 114 and can be provided with a slide valve or star feeder 116 to control the flow of the catalyst therefrom. An inert fluidizing medium can be introduced into standpipe 113 by line 115. A carrier gas supplied by line 117 or 124 picks up the catalyst and carries it through transfer line 118 for distribution at spaced points in the reactor through any one or more of the lines 119, the catalyst preferably being in the dispersed phase in transfer lines 118 and 119. Line 118 may be provided with a jacket 120 to supplement or to replace the catalyst cooler 114. In one embodiment the gas supplied to line 118 may comprise a portion of a recycle gas fraction from the products separation system diagrammatically illustrated at 121. For this purpose a more reactive fraction such as that recovered from separator 80 or absorber 89 of the products separation system of Figure 1 can be used to effect a high gas recycle through the synthesis zone. Thus the gas may be recycled from the separation system by line 122, pump 123 and line 124 to transfer conduit 118 for the dual purpose of carrying the stripped and cooled catalyst into the reaction zone and for effecting a recycle of the unreacted portions of the said gas. A cooler 128 can be provided on line 124 to extract heat from the recycled gas.

Another, and usually less reactive, portion of a recycle gas can be sent by lines 124 and 125 to serve as all or a part of the stripping fluid introduced into stripping section 109 by means of distributor 112. In some instances it will be desirable to heat the stripping fluid and heater 126 on line 125 can be provided for this purpose. It is also contemplated that an extraneous gas can be introduced by line 127 to replace or supplement the recycled gas. When the carrier gas is steam it can be supplied from heat exchanger 114. The extraneous gas may, for example, also serve to regenerate or activate the recycled catalyst. Ammonia and hydrogen are useful for such purposes. A quantity of the catalyst may be removed intermittently or continuously at a selected point for reworking and/or activation before recycle. The above embodiments are only a few examples of the many modifications of systems for stripping the catalyst, cooling the stripped catalyst in an external zone and returning the catalyst for synthesis temperature control. Cooling may be effected by contacting withdrawn catalyst directly with a volatile normally liquid hydrocarbon or hydrocarbon fraction having between about 6 and 10 carbon atoms per molecule which can, for example, be derived from the synthesis product.

With cobalt catalyst of about 10 to 40 pounds per cubic foot bulk density (in settled condition) and of about 100 to 400 mesh particle size the vertical vapor velocity in the reactor may be from about 0.1 to 10 feet per second, usually 0.5 to 1.5 feet per second. With iron catalyst of about 40 to 200 pounds per cubic foot (settled density) and the same particle size, the vertical vapor velocity may be in the same broad range, but usually somewhat higher than with cobalt. Aeration gas in standpipe should have a considerably lower vertical velocity, for example, .005 to .1 or more feet per second.

The actual amount of catalyst in the reactor at any given time will depend upon the activity of the particular catalyst and the particular conversion which is desired. With catalysts of the type of cobalt on kieselguhr promoted by thorium oxide and with the size of plant herein described I may require as much as 30,000 cubic feet of catalyst in the reactor, i. e., about 150 to 200 tons of catalyst. If a single reactor is employed it may be as much as 60 feet high and about 25 to 30 feet in diameter. I may, however, use a number of smaller reactors in parallel since it may be advantageous to use reactors about 15 to 20 feet in diameter and about 30 to 50 feet high. The settling zone may be approximately the same diameter as the reactor or even smaller since there is a marked contraction in the synthesis reaction gas volume. Reactors, settling chambers, etc. may be made of various shapes and sizes without departing from the invention. With an iron catalyst a considerably smaller volume of catalyst is required, e. g. as much as 20,000 cubic feet; hence a smaller reactor may be employed.

In starting up the system with cobalt catalyst I first charge the upper hoppers with catalyst material and charge a heating fluid such as steam to the jackets around pipe 60 so that this catalyst is heated to a temperature of, for example, 380° F. The make gas stream is introduced at the base of the reactor so that it will have a vertical velocity of about 1 foot per second and the powdered catalyst is dispersed and suspended in this up-flowing gas until the reactor is filled with a dense phase of suspended catalyst. After a preliminary soaking period the synthesis reaction is initiated and as soon as there is a temperature rise in the reactor the steam around standpipe 60 is replaced by water. The temperature of this water is controlled by maintaining a regulated pressure on the steam which is produced by its vaporization. Temperature in the reactor may be held within very close limits by regulating the amount of cooling in the tubes or the amount of recycled catalyst, or both. When equilibrium has been established the system functions smoothly and continuously at the chosen temperature which, in this case, may be 380° F.

Liquid reaction products are stripped out of settled catalyst in the upper hopper by stripping gases introduced by lines 58 through distributor 59. The stripped products together with reaction products are taken overhead through line 78, through cooler 79 to separator 80 wherein water separates as a lower layer, oil as an intermediate layer, and gases as an upper layer. The water is withdrawn through line 81 to a catalyst recovery system 82. Catalyst may be sedimented or filtered from the water and worked up into fresh catalyst. Alternatively the catalyst-laden water may be flashed to form steam containing suspended catalyst particles and this steam may be introduced through line 58 so that the catalyst is returned to the upper hopper simultaneously with the stripping of hydrocarbons from catalyst in said hopper.

Oil from the intermediate layer in settler 80 is withdrawn through line 83 to fractionation system 84 which is diagrammatically shown as a single column but which, in actual practice, would consist of two or more columns, the gasoline and lighter fractions being taken overhead from the first column, the gasoline being stabilized in the second column, etc. Since no invention is claimed in this fractionation system it is diagrammatically illustrated as a column from which gases are taken overhead through line 85, gasoline is withdrawn as a side stream through line 86, and heavy oils are withdrawn from the bottom through line 87.

Gases from the top of separator 80 are introduced through line 88 to absorber tower 89 through which an absorber oil, such as naphtha, is introduced through line 90. Unabsorbed hydrogen, carbon monoxide, carbon dioxide, methane, ethane and ethylene are taken overhead from tower 88 through line 91. A part of this stream, for example, as much as 75%, is passed by line 19 to the gas reformer 14 for the production of further quantities of make gas. Another part of the stream from line 91 can be passed by line 92 to line 13 and burned in the gas reformer furnace for supplying heat and carbon dioxide for the gas reforming step. A portion of the recycle gas can be sent by lines 91, 111 and 100 to serve as the stripping fluid introduced by 59 and ultimately recycled to the burner or reformer.

Rich oil from the base of tower 89 is pumped through line 93 to the top of stripper tower 94 and the light gasoline fractions together with $C_3$ and $C_4$ hydrocarbons are taken overhead from this tower through line 95 to the fractionation system 84. The denuded scrubber oil is then pumped back through line 96, heat exchanger 97, and cooler 98 to the top of absorber tower 89.

The gas from line 85 may be withdrawn from the system through line 99 and charged to any suitable conversion process such as polymerization, alkylation, gas reversion, etc. for the preparation of valuable motor fuels, lubricating oils, etc. Alternatively some of these gases may be passed through line 100, heater 101 and thence through line 58 to be used as a stripping medium in the upper hopper. The temperature of these gases in line 58 should be sufficiently high to effect the vaporization and stripping of any liquid hydrocarbons deposited on the catalyst. Instead of employing hydrocarbon gases for this stripping I may, of course, simply use steam from line 102 or hydrogen from an extreme source. If steam is to be employed it may be desirable to flash the catalyst containing water from recovery system 82 and to return the steam so produced together with suspended catalyst solids through line 103. Carbon dioxide from line 104 may be used as the stripping gas, since this gas is eventually recycled to the gas reforming step for the production of further amounts of synthesis gas.

Usually a single synthesis stage with the recycling hereinabove described is sufficient to obtain excellent yields. I may, however, charge the gases from separator 80 to a second synthesis stage which may be similar in design but smaller in size than the stage hereinabove described. With the single stage and recycling as hereinabove described, the following yields of the following products may be obtained:

|  | Barrels |
|---|---|
| Light naphtha | 1,500 |
| Heavy naphtha | 1,500 |
| Gas oil | 1,100 |
| Wax | 500 |

The exact yield of various products will, of course, depend upon the particular temperature selected, the nature of the catalyst employed, the time of contact between catalyst and make gas, the amount of catalyst contacted by make gas, the pressure, etc. Generally speaking, the time of contact for cobalt catalyst may be about 5 to 60 seconds or more, usually at least about 10 to 20 seconds. For iron catalysts, the time of contact may be much shorter, e. g. about 1 to 30 seconds. Space velocities of between about 100 and 1000 volumes of gas per volume of catalyst per hour can be used with cobalt catalyst at pressures of between about atmospheric or lower and 300 pounds per square inch and even higher. With iron catalysts, space velocities may be as high as 5000 volumes of gas per hour per volume of catalyst, the higher space velocities accompanying the higher temperatures and pressures. By volume of catalyst I mean that volume which the dense phase fluidized catalyst normally occupies at rest in the settled state. In general for a given temperature level lower pressure and lower space velocities can be used with cobalt than with iron catalysts. However, iron catalyst is usually employed at higher temperature and pressure than cobalt, as previously noted.

The gasoline or naphtha produced by this process is usually characterized by a fairly low knock rating and I may subject it to a catalytic reforming process of the type in which its vapors are contacted with a clay type catalyst of the silica-alumina type at a temperature of about 850 to 1000° F., a pressure of about atmospheric to 50 pounds per square inch and a space velocity of about 4 to 40 volumes of liquid feed per volume of catalyst space per hour. Alternatively the vaporized naphtha may be contacted at a temperature of about 850 to 1050° F., usually about 925 to 950° F., at a pressure of about 50 to 600 pounds per square inch, preferably about 200 to 300 pounds per square inch, at a space velocity of about 0.2 to 2.0 volumes of liquid feed per volume of catalyst space per hour, preferably about 0.5 to 1.0 v./v./hr. with an on-stream time of about 1 to 12 hours, preferably about 6 hours and with a catalyst comprising molybdenum oxide or chromium oxide supported on active alumina or the like. In this catalytic reforming process I prefer to employ about 100 to 5000, preferably about 2500, cubic feet of recycle gas (containing about 40% to 75% hydrogen) per barrel of stock charged. This catalytic reforming of the synthesis gasoline produces large yields of isomerized and aromatized hydrocarbons of very high knock rating.

The naphtha may, of course, be subjected to a gas reversion process together with $C_3$ and $C_4$ hydrocarbons. It may be freed from olefins as, for example by alkylation and the paraffinic residue may be isomerized with aluminum chloride or an aluminum chloride complex. Heavy product fractions may be subjected to catalytic cracking for which it constitutes an excellent charging stock.

The waxes produced by my process are valuable by-products per se and by employing relatively low synthesis temperatures and/or high synthesis pressures I may markedly increase the heavy oil and wax yields. By employing relatively high temperature, such as about 400 to 425° F., I may produce large quantities of light liquid hydrocarbons and normally gaseous hydrocarbons which may be particularly valuable as charging stocks for polymerization, alkylation, gas reversion, or other refining or synthesis processes. All of the products are valuable for chemical synthesis because of their strictly aliphatic character and their freedom from naphthenic and aromatic hydrocarbons (which normally occur in petroleum products and which are so difficult to separate from aliphatic hydrocarbons of similar boiling points).

This application is a continuation-in-part of my copending application Serial Number 516,053, filed December 29, 1943, now abandoned, which in turn is a continuation-in-part of an earlier application, Serial Number 390,203, filed April 24, 1941 (now U. S. Patent 2,347,682).

While I have described in detail preferred embodiments of my invention and have given an example of operating conditions, it should be understood that the invention is not necessarily limited to any of the details hereinabove set forth. For example it is contemplated that lower contacting times of the order of 1 to 4 seconds can be used, giving an overall range of not more than about 60 seconds. Likewise cooled catalyst can be introduced upwardly or downwardly at a plurality of horizontally spaced points. This can be accomplished by means of a plurality of inlets such as provided by a perforated baffle, a manifolded distributor, or a plurality of conduits extending into the catalyst phase. These and other operating conditions and apparatus modifications will become apparent to those skilled in the art from the above description.

I claim:

1. A process for carrying out chemical reactions which comprises passing a fluidized mass of solid particles of small particle size in a gaseous medium upwardly through a confined passageway formed by heat exchange surfaces arranged and terminating within a large enclosed zone, passing solid particles and gaseous medium upwardly from said passageway into a space of larger cross-sectional area than said passageway so that some of the particles settle out of the gaseous medium, passing said settled particles downwardly in contact with heat exchange surfaces in said large enclosed zone to cool the solid particles, mixing the cooled particles with additional gaseous medium, and passing the last named mixture as a fluidized mass through the said passageway.

2. A method of controlling the reaction temperature in an exothermic reaction which comprises passing a fluidized mass of finely divided solid particles in a gaseous medium containing a reactant gas upwardly through a confined passageway formed with a heat exchange surface so that some of the heat liberated by the reaction is absorbed by the heat exchange surface, reducing the velocity of the fluidized mass as it leaves the top of the passageway to separate some of the finely divided solid particles from the fluidized mass, dropping the separated particles over other heat exchange surfaces to cool the particles and returning the separated cooled solid particles to the confined passageway with additional reactant gas.

3. The method of effecting synthesis which comprises introducing hydrogen and carbon monoxide in synthesis proportions at a low level in a synthesis zone containing a large mass of solid synthesis catalyst particles from about 100 mesh to less than 400 mesh in particle size, maintaining an upward gas velocity in the synthesis zone in the range of about .1 to 5 feet per second and sufficient to maintain the catalyst in suspended turbulent dense phase condition in the lower part of the synthesis zone, maintaining the synthesis zone under synthesis conditions of temperature and pressure, settling from the gaseous stream leaving the dense phase at least the major part of catalyst particles entrained therewith, effecting said settling in an upper zone which is above and in direct communication with the synthesis zone with its lower portion surrounding and in heat exchange relationship with the upper portion of the synthesis zone, maintaining the settled catalyst in dense phase fluent condition in the lower part of the upper zone, stripping high boiling synthesis products from the dense phase fluent settled catalyst before cooling and while it is in dense phase condition, cooling the stripped catalyst in a zone below the upper zone laterally adjacent the synthesis zone before it is commingled with introduced hydrogen and carbon monoxide, and commingling the cooled catalyst with catalyst in the synthesis zone for absorbing at least a part of the exothermic heat of synthesis.

4. The method of effecting synthesis which comprises introducing carbon monoxide and hydrogen at a low level in a synthesis zone which contains a large mass of solid synthesis catalyst of small particle size, passing the gas upwardly in the synthesis zone at a velocity sufficient to maintain the catalyst in suspended turbulent dense phase condition in the lower part of the synthesis zone under synthesis pressure and at synthesis temperature, withdrawing ascending gases containing large amounts of entrained catalyst particles from said dense phase to a superimposed separation zone the base of which is in heat exchange relationship with the top of the synthesis zone, settling most of the catalyst particles from gases in the separation zone to form a dense phase mass of settled catalyst in that portion of the separation zone which is in heat exchange relationship with the synthesis zone, stripping the dense phase mass of settled catalyst for removing high boiling synthesis products therefrom, cooling the stripped catalyst particles in a zone outside of said synthesis zone before said particles are commingled with introduced hydrogen and carbon monoxide and returning at least a part of the cooled catalyst particles back to said synthesis zone at a low level therein and before said cooled catalyst particles contact introduced hydrogen and carbon monoxide.

5. The method of effecting synthesis which comprises introducing hydrogen and carbon monoxide in synthesis proportions at a low level in a synthesis zone containing a large mass of solid synthesis catalyst particles from about 100 mesh to less than 400 mesh in particle size, maintaining an upward gas velocity in the synthesis zone in the range of about .1 to 5 feet per second and sufficient to maintain the catalyst in suspended turbulent dense phase condition in the lower part of the synthesis zone, maintaining the synthesis zone under synthesis conditions of temperature and pressure, effecting a net upward flow of catalyst particles in the synthesis zone by continuously removing catalyst from the top of said zone and continuously introducing catalyst at substantially the base of said zone, settling catalyst withdrawn from the top of said zone in a settling zone which is above and in direct communication and heat exchange relationship with the top of the synthesis zone to form a liquid-like mass of settled catalyst, passing an inert gas upwardly through the settled mass of liquid-like catalyst in amounts sufficient to strip reaction products therefrom and to maintain the solids in liquid-like condition, flowing the catalyst while it remains in liquid-like condition from the base of the settling zone downwardly in contact with heat exchange surfaces in a cooling zone which surrounds said synthesis zone, and withdrawing cooled catalyst from the base of the cooling zone for the introduction at substantially the base of the synthesis zone.

6. A method of effecting synthesis which comprises introducing hydrogen and carbon monoxide in synthesis proportions at a low level in an inner synthesis zone containing a large mass of solid synthesis catalyst particles from about 100 mesh to less than 400 mesh in particle size, maintaining an upward gas velocity in the inner synthesis zone in the range of about .1 to 5 feet per second and sufficient to maintain the catalyst in suspended, turbulent, dense phase, liquid-like condition, maintaining the synthesis zone under synthesis conditions of temperature and pressure, continuously discharging gases containing large amounts of entrained catalyst particles from the upper part of said dense phase into a settling zone which is immediately above the conversion zone and in open communication and heat exchange relationship therewith, separating catalyst from said stream in said settling zone both centrifugally and by gravity to obtain a mass of separated catalyst in dense phase condition, stripping the separated catalyst while it is in dense phase condition in the lower part of said settling zone for removing reaction products from the settled catalyst, passing the stripped catalyst through an outer cooling zone which is below the upper settling zone and laterally adjacent the inner synthesis zone and returning cooled catalyst to the inner synthesis zone before contacting it with introduced hydrogen and carbon monoxide.

7. The method of claim 6 which includes the step of maintaining a mass of cooled catalyst in a lower zone which is beneath both the inner and outer zones, discharging catalyst from the outer zone to the lower zone, maintaining catalyst in fluent condition in the lower zone by passing an inert gas upwardly through the lower zone and passing catalyst from the lower zone directly into the inner zone.

8. A conversion apparatus for handling fluidized solids which comprises a cylindrical reactor having a bottom opening in its bottom wall and a top opening in its top wall, an annular chamber surrounding said reactor, a large number of vertical tubes in said annular chamber, a settling chamber superimposed above and in direct communication with the upper opening in the reactor and with connections at its base to said vertical tubes, the top wall of the reactor forming a bottom wall of the settling chamber, at least one cyclone separator mounted in the upper part of said settling chamber having a dip leg extending to the lower part thereof, connections for introducing stripping gas at the base of said settling chamber, means for passing a heat exchange fluid around said reactor and around the vertical tubes in said annular chamber, a fluidized solids reservoir mounted at the base of said reactor for supplying fluidized solids to the bottom opening thereof and with its upper end in open communication with the lower ends of said tubes, the bottom wall of the reactor forming an upper wall of said reservoir, an aeration gas inlet for maintaining solids in aerated condition in the reservoir and a separate conduit for introducing a charging stock stream directly into the base of the reactor while said stream is out of contact with solids entering the reactor from said reservoir.

ROBERT C. GUNNESS.

REFERENCES CITED

The following references are of record in the file of this patent:

UNITED STATES PATENTS

| Number | Name | Date |
|---|---|---|
| 1,984,380 | Odell | Dec. 18, 1934 |
| 2,253,486 | Belchetz | Aug. 19, 1941 |
| 2,357,901 | Lewis et al. | Sept. 12, 1944 |
| 2,360,787 | Murphree et al. | Oct. 17, 1944 |
| 2,373,008 | Becker | Apr. 3, 1945 |
| 2,394,814 | Snuggs | Feb. 12, 1946 |
| 2,409,234 | Arveson | Oct. 15, 1946 |
| 2,416,729 | Arveson | Mar. 4, 1947 |
| 2,421,677 | Belchetz | June 3, 1947 |